United States Patent [19]
Towata et al.

[11] Patent Number: 5,703,002
[45] Date of Patent: Dec. 30, 1997

[54] PHOTOCATALYST PARTICLES CONTAINING FERROMAGNETIC METAL PARTICLES AND METHOD FOR SYNTHESIS THEREOF

[75] Inventors: Atsuya Towata; Mutsuo Sando, both of Nagoya, Japan

[73] Assignee: Agency of Industrial Science & Technology, Ministry of International Trade & Industry, Tokyo, Japan

[21] Appl. No.: 703,550

[22] Filed: Aug. 27, 1996

[30] Foreign Application Priority Data

Aug. 30, 1995 [JP] Japan ................................. 7-246919

[51] Int. Cl.$^6$ ...................... B01J 23/06; B01J 21/06
[52] U.S. Cl. ..................... 502/350; 502/343; 502/328; 502/329; 502/349
[58] Field of Search ......................... 502/350, 343, 502/328, 329, 349

[56] References Cited

U.S. PATENT DOCUMENTS

| | | | |
|---|---|---|---|
| 4,579,594 | 4/1986 | Nanao et al. | 106/287.24 |
| 4,695,393 | 9/1987 | Whitehead et al. | 252/62.54 |
| 5,145,719 | 9/1992 | Towata et al. | |
| 5,190,841 | 3/1993 | Saha et al. | 430/106.6 |
| 5,541,096 | 7/1996 | Nomura et al. | 435/176 |

OTHER PUBLICATIONS

Shinri Sato. "Photodecomposition of Water Over Pt/TiO$_2$ and NiO$_2$/TiO$_2$", Journal of the Chemical Society of Japan, No. 8, (pp. 1182–1187), 1988. (With English Abstract) (no month).

*Primary Examiner*—Glenn Caldarola
*Assistant Examiner*—Nadine Preisch
*Attorney, Agent, or Firm*—Oblon, Spivak, McClelland, Maier & Neustadt, P.C.

[57] ABSTRACT

Photocatalyst particles consist essentially of a matrix consisting of the crystal phase of a semiconducting metal oxide as a photocatalyst and ferromagnetic metal particles dispersed in the matrix, having an average particle diameter of 15 nm at most and a specific surface area of 100 m$^2$/g at least, and permitting recovery by a magnetic force. A method for the production of the photocatalyst particles consists essentially of dispersing water in a hydrophobic organic solvent containing a surfactant thereby forming a microemulsion, adding to the microemulsion a raw material for the formation of the crystal phase of a semiconducting metal oxide as a photocatalyst and a raw material for the formation of ferromagnetic metal particles, causing the raw materials contained in the mixture resulting from the preceding step to undergo hydrolysis and inducing precipitation of the hydroxide and oxide thereof in the resultant mixture, separating the precipitates from the resultant mixture, and heat-treating the separated precipitates under a reducing condition.

14 Claims, No Drawings

PHOTOCATALYST PARTICLES CONTAINING FERROMAGNETIC METAL PARTICLES AND METHOD FOR SYNTHESIS THEREOF

BACKGROUND OF THE INVENTION

1. Field of the Invention

This invention relates to photocatalyst particles composed of the crystal phase matrix of a semiconducting metal oxide and a ferromagnetic metal dispersed in the matrix and used for a heterogeneous photocatalytic reaction and a method for the synthesis of the photocatalyst particles.

2. Description of the Prior Art

The crystal particles of such solid semiconducting metal oxides as titania and zinc oxide have been heretofore used as photocatalysts for the heterogeneous photocatalytic reaction. In the heterogeneous photocatalytic reaction, the reaction occurs in the neighborhood of the surface of the catalyst used. For the purpose of improving the reactivity of this catalysis, it is preferable to increase the specific surface area of the catalyst, namely the surface area per unit mass thereof. When the crystal particles of a semiconducting metal oxide are used as the heterogeneous photocatalyst (referred to as "photocatalyst" hereinafter), therefore, it is preferable that the crystal particles have a small diameter.

After the reaction has been completed, it is generally preferable for the photocatalyst to be recovered by a simple method and put to re-use. Such methods of recovery as filtration and precipitation are adopted.

When the photocatalyst particles are reduced in size for the purpose of increasing the specific surface area, however, the recovery becomes increasingly difficult. Thus, it has been heretofore customary to use semiconductor crystal particles having a diameter of some tens of nm, a size that is a compromise in terms of specific surface area versus ease of recovery. This practice, therefore, has entailed the problem that the specific surface area is not very large and the reactivity is not very high.

It is practically desired to develope photocatalyst particles which have high activity and are easily recovered for re-use.

SUMMARY OF THE INVENTION

The present inventors pursued a study with a view to meeting this desire. This invention has been accomplished as a result.

Specifically, the present invention relates to photocatalyst particles which consist essentially of a matrix consisting of the crystal phase of a semiconducting metal oxide and ferromagnetic metal particles dispersed in the matrix, possess an average particle diameter of 15 nm at the maximum and a specific surface area of 100 $m^2/g$ at the minimum, and permit recovery by means of magnetic force and to a method for the production of the photocatalyst particles which consists essentially of forming a microemulsion by dispersing water in a hydrophobic organic solvent containing a surfactant, adding to the resultant microemulsion a raw material capable of forming the crystal phase of a semiconducting metal oxide destined to serve as a photocatalyst and a raw material capable of forming ferromagnetic metal particles, causing the raw materials contained in the mixture resulting from the preceding step to undergo hydrolysis and inducing precipitation of the hydroxide and oxide thereof in the resultant mixture, separating the precipitates from the resultant mixture, and heat-treating the separated precipitates under a reducing condition.

DESCRIPTION OF THE PREFERRED EMBODIMENTS

The individual photocatalyst particles of this invention have particles of a ferromagnetic metal contained in a dispersed state therein. After the heterogeneous photocatalytic reaction, therefore, they can be attracted by a magnetic force of appropriate intensity and consequently can be easily separated and recovered from the reactants, products, and other components in the heterogeneous photocatalytic reaction system. Moreover, they have an average particle diameter of 15 nm at the maximum and a specific surface area of 100 $m^2/g$ at the minimum and, as a result, are markedly superior in reactivity.

In the method of this invention, the hydroxide and the oxide destined to form a photocatalyst and a ferromagnetic metal are precipitated as compounded in the neighborhood of the interface of the microemulsion and they are heat-treated together under one and the same condition subsequently to give rise to the photocatalyst particles aimed at. The photocatalyst particles of this invention, which consist of a photocatalyst having the crystal phase of a semiconducting metal oxide as a matrix and ferromagnetic metal particles dispersed in the matrix, can therefore be synthesized advantageously from the commercial point of view without requiring any complicated process.

As the crystal phase of a semiconducting metal oxide constituting a matrix of photocatalyst particles of this invention, heretofore known semiconducting metal oxides such as titania and zinc oxide can be adopted either singly or in a combination of two or more members. As the raw materials for the formation of the above said metal oxide, the alkoxides, halogenides, and the like of the aforementioned metals are used.

As the ferromagnetic metal particles to be dispersed in the matrix, nickel, cobalt, iron, etc. are used either singly or in a mixture of two or more members. As the raw materials for the formation of the ferromagnetic metal, the alkoxides, nitrates, acetates, halogenides, etc. of the relevant metals are used. The ratio of the ferromagnetic metal to the total amount of the photocatalyst particles is preferably in the approximate range of 2~20% by weight. The reason for this specific range is that the photocatalyst particles are not satisfactorily attracted by a magnetic force and the recovery of the photocatalyst particles is difficulty if the content of the ferromagnetic metal content is less than 2% and the reactivity of the photocatalyst is unduly low if the content exceeds 20%.

The photocatalyst particles according to this invention comprise compound particles consisting of the crystal phase of the semiconducting metal oxide as a matrix and the particles of the ferromagnetic metal dispersed in the matrix. By the method for synthesis contemplated by this invention, the photocatalyst is enabled to acquire excellent reactivity by having an average particle diameter of 15 nm at the maximum and a specific surface area of 100 $m^2/g$ at the minimum. Here, the average particle diameter is obtained by calculation from the specific surface area measured by the BET method.

The microemulsion of this invention is produced by dispersing water in a continuous phase formed of a hydrophobic organic solvent thereby forming a dispersed phase and adding a surfactant to the dispersed phase. The microemulsion produced by the above process is stable. Concrete examples of the hydrophobic organic solvent usable herein include hexane, toluene, benzene, and xylene. The water content in the microemulsion is preferably in the approximate range of 9–11 g/liter, more preferably in the neighborhood of 10 g/liter. The amount of the surfactant in the hydrophobic organic solvent is in the range of $1.0 \times 10^{-5} \sim 1.0 \times 10^{-3}$ mol/L.

As the surfactant to be added for the purpose of stabilizing the microemulsion, any of anionic surfactants, cationic surfactants, nonionic surfactants, and amphoteric surfactants may be used. In the case of a nonionic surfactant, the HLB (hydrophile-lipophile balance) is preferably in the range of 3.5–6. The reason for this range is that the microemulsion does not fully develop and the dispersion is not obtained to a high degree if the HLP is less than 3.5 and the microemulsion is not stabilized if the HLP exceeds 6.

Then, the raw materials for the photocatalyst and the ferromagnetic metal are dissolved or decomposed in the hydrophobic organic solvent (the substance that forms the continuous phase of the microemulsion) to prepare a compound metal solution. The compound metal solution and the microemulsion are combined and are vigorously stirred with ultrasonic waves and/or a stirrer for several hours—some tens of hours. In consequence of this treatment, the raw materials mentioned above and water generate a hydrolysis reaction in the neighborhood of the interface between the continuous phase formed of the hydrophobic organic solvent and the disperse phase formed of water in the microemulsion. By this hydrolysis reaction, the raw materials for the photocatalyst and the ferromagnetic metal are separately precipitated as a metal oxide and a metal hydroxide to give rise to the precursor of the photocatalyst particles which has the metal oxide or metal hydroxide for the formation of the ferromagnetic metal dispersed and contained in the matrix of the metal oxide or metal hydroxide for the formation of photocatalyst.

For the hydrolysis reaction, the sum of the amounts of the metal elements of the raw materials for the photocatalyst and the ferromagnetic metal contained in the microemulsion is properly one half to several times the amount estimated to be necessary stoichiometrically for the reaction, based on the amount of the water in the microemulsion. Where the raw material for the formation of the photocatalyst happens to be a liquid, the compound metal solution may be prepared by either dissolving or decomposing the raw material for the formation of the ferromagnetic metal in this raw material.

In the method for the synthesis of the photocatalyst particles according to this invention, the separation of the precursor of the photocatalyst particles from the reaction solution by means of centrifugation, for example, is preferably effected after completion of the hydrolysis reaction mentioned above and subsequently the treatment which comprises washing with an organic solvent, dispersion in a solvent of small surface tension, and drying by the use of a vacuum drier, for example, is carried out before the heat treatment which will be described specifically hereinbelow. The unaltered raw materials can be removed from the precursor of the photocatalyst particles by washing the precursor of the photocatalyst particles several times with an organic solvent and the precursor of the photocatalyst particles can be given a uniform particle size by first dispersing the precursor of the photocatalyst particles in such a solvent as methyl alcohol which has small surface tension and then drying the resultant dispersion by the use of a vacuum drier, for example. As a result, the heat treatment which will be described specifically hereinafter is enabled to produce homogeneous photocatalyst particles.

Further, in the method for the synthesis of photocatalyst particles according to this invention, the precursor of the photocatalyst particles obtained by the hydrolysis reaction is enabled to form and grow therein the crystal phase of a semiconducting metal oxide and form the particles of a ferromagnetic metal component therein by reduction and produce therein the photocatalyst particles aimed at by heat-treating the precursor under a reducing ambience. The reducing condition in the heat treatment of this kind can be realized by any of the known techniques such as by mixing an inert gas such as nitrogen with a gas such as hydrogen which possesses a reducing property at a prescribed ratio. Preferably, this heat treatment is carried out at a temperature in the range of 250°–400° C. The reason for this range is that the reduction of the oxide or hydroxide of the ferromagnetic metal component to the relevant metal is not be fully attained and, as a result, the ferromagnetic metal particles are not produced sufficiently if the temperature is less than 250° C. and the crystals of semiconducting metal oxide grow excessively and tend to acquire an unduly large particle diameter if the temperature exceeds 400° C.

The effect of this invention will now be described.

The photocatalyst particles of this invention abound in reactivity as heterogeneous photocatalyst because they have an average particle diameter of 15 nm at most and a specific surface area of 100 m$^2$/g at least. They are characterized by being recoverable with a magnetic force because they have particles of a ferromagnetic metal component dispersed and contained therein. Since these photocatalyst particles can be re-used, they can reduce the cost of catalysis. By combining two or more photocatalytic components, it is possible to obtain homogenous photocatalyst particle combinations which include the different components at an arbitrary ratio and combine the characteristics of a plurality of photocatalysts of semiconducting metal oxides.

In the method of this invention for the synthesis of photocatalyst particles, the hydroxide or oxide designed to form the photocatalyst component and the ferromagnetic metal component are precipitated as compounded in the neighborhood of the surface of a microemulsion and are subsequently heat-treated under one and the same condition to give rise to photocatalyst particles aimed at by this invention. Thus, this invention enables the photocatalyst particles to be synthesized advantageously from the commercial point of view without requiring any complicated process. When the raw materials for two or more photocatalyst components are used in combination, it becomes possible to obtain homogenous photocatalyst particle combinations which include the different components at an arbitrary ratio and combine the characteristics of a plurality of photocatalysts of semiconducting metal oxides.

[EMBODIMENTS]

Several working examples of this invention will be set out below to describe this invention more specifically. It should be noted that the invention is not restricted in any sense by the working examples so cited but that various changes, improvements, and modifications may be made based on the knowledge of any person of ordinary skill in the art without departing from the spirit and scope of this invention.

Example 1

In about 100 ml of n-hexane, 0.01 g of a polyhydric alcohol ester of fatty acid, a nonionic surfactant of HLB: 5.9, (produced by Katayama Kagaku K. K. and marketed under the tradename "Span 60") was dissolved. A microemulsion was prepared by combining the resultant solution with 0.3 g of water and stirring it vigorously with ultrasonic waves and a stirrer. Meanwhile, a compound metal solution was prepared by dissolving 0.6 g of nickel nitrate in 3 g of titanium tetra-normal butoxide [Ti(n-BtO)$_4$]. This compound metal solution was gradually added to the microemulsion. The mixture was stirred with the stirrer at 240 rpm while being reacted at 25° C. for 10 hours.

After the reaction was completed, the precipitated powder, i.e. the reaction product, was separated from the reaction solution, dispersed by treatment with ultrasonic waves, then washed three times with n-hexane and three times with methanol, and dried at normal room temperature. Thereafter, in a reducing gas consisting of nitrogen gas containing 5% of hydrogen gas, the dried reaction product was heat-treated at 300° C. to obtain photocatalyst particles of this invention having nickel particles dispersed in a titania crystal phase as a matrix.

Examples 2 and 3

Photocatalyst particles of this invention were obtained by following the procedure of Example 1 but changing the amount of nickel nitrate to 1.2 g and 0.3 g.

These photocatalyst particles were subjected to observation under an electron microscope, chemical analysis, determination of specific surface area, and X-ray diffraction analysis. As a result, they were confirmed to have nickel particles uniformly dispersed in the crystal phase, i.e. the matrix formed of an aggregate of microfine particles of anatase and rutile type titania. When these photocatalyst particles were exposed to a magnetic force, they were attracted by the magnetic force. When the photocatalyst particles obtained by following the procedure described above but without addition of nickel nitrate were exposed to the magnetic force, they showed no reaction to the magnetic force. The photocatalyst particles of Examples 1–3 were tested for nickel content, average particle diameter, and specific surface area. The results of this test are shown in Table 1. Specific surface area was determined by the BET method using nitrogen adsorption.

TABLE 1

| | Amount of Ti(n-BtO)$_4$ (g) | Amount of Ni(NO$_3$)$_2$ (g) | Ni content wt % | Average particle diameter (nm) | Specific surface area (m$^2$/g) |
|---|---|---|---|---|---|
| Example 1 | 3 | 0.6 | 5.7 | 11 | 134 |
| Example 2 | 3 | 1.2 | 11.1 | 14 | 101 |
| Example 3 | 3 | 0.3 | 3.1 | 12 | 117 |

The results given in Table 1 show that the photocatalyst particles of the working examples of this invention had specific surface areas larger than 100 m$^2$/g and manifested good reactivity.

Example 4

A powder was obtained by following the procedure of Example 1 except for using ligroine as a hydrophobic organic solvent in the place of n-hexane. The powder was subjected to observation under an electron microscope and X-ray diffraction analysis. As a result, it was confirmed to consist of photocatalyst particles of this invention having nickel particles dispersed in a titania crystal phase matrix. The compound particles were attracted by a magnetic force.

Example 5

A powder was obtained by following the procedure of Example 1 except for using 2-sulfosuccinic acid dialkylamide, an anionic surfactant, (produced by Tokyo Kasei K. K. and marketed under the tradename "Airsol OT") in the place of the nonionic surfactant (Span 60). The powder was subjected to observation under an electron microscope and X-ray diffraction analysis. As a result, it was confirmed consist of photocatalyst particles of this invention having nickel particles dispersed in a titania crystal phase matrix. The compound particles were attracted by a magnetic force.

Example 6

A powder was obtained by following the procedure of Example 1 except for using zinc chloride as a raw material for the formation of photocatalyst particles in the place of titanium normal butoxide. The powder was subjected to observation under an electron microscope and X-ray diffraction analysis. As a result, it was confirmed to consist of photocatalyst particles of this invention having nickel particles dispersed in a zinc oxide crystal phase matrix. The compound particles were attracted by a magnetic force.

Example 7

A powder was obtained by following the procedure of Example 1 except for using cobalt nitrate in the place of nickel nitrate. The powder was subjected to observation under an electron microscope and X-ray diffraction analysis. As a result, it was confirmed to consist of photocatalyst particles of this invention having nickel particles dispersed in a titania crystal phase matrix. The compound particles were attracted by a magnetic force.

What is claimed is:

1. Photocatalyst particles consisting essentially of a matrix consisting of a crystal phase of a semiconducting metal oxide and ferromagnetic metal particles dispersed in said matrix, wherein said photocatalytic particles have an average particle size of 15 nm at most and a specific surface area of at least 100 m$^2$/g.

2. The photocatalyst particles according to claim 1, wherein said semiconducting metal oxide is at least one member selected from the group consisting of titania and zinc oxide.

3. The photocatalyst particles according to claim 1, wherein said ferromagnetic metal particles are formed of at least one member selected from the group consisting of nickel, cobalt, and iron.

4. The photocatalyst particles according to claim 1, wherein said ferromagnetic metal particles comprise 2 to 20% by weight of said photocatalyst particles.

5. A method for the production of photocatalyst particles according to claim 1, which consists essentially of dispersing water in a hydrophobic organic solvent containing a surfactant thereby forming a microemulsion, adding to said microemulsion a raw material for the formation of the crystal phase of a semiconducting metal oxide as a photocatalyst and a raw material for the formation of ferromagnetic metal particles, causing said raw materials contained in the mixture resulting from the preceding step to undergo hydrolysis and inducing precipitation of the hydroxide and oxide thereof in said resultant mixture, separating said precipitates from said resultant mixture, and heat-treating the separated precipitates under a reducing condition.

6. The method according to claim 5, wherein said hydrophobic organic solvent is at least one member selected from the group consisting of hexane, toluene, benzene, and xylene.

7. The method according to claim 5, wherein said surfactant is at least one member selected from the group consisting of anionic surfactant, cationic surfactant, nonionic surfactant, and amphoteric surfactant.

8. The method according to claim 7, wherein said surfactant is a nonionic surfactant and has an HLB in the range of 3.5 to 6.

9. The method according to claim 7, wherein the content of said surfactant in said hydrophobic organic solvent is in the range of $1.0 \times 10^{-5}$ to $1.0 \times 10^{-3}$ mol/L.

10. The method according to claim 5, wherein the amount of water dispersed in said microemulsion is in the range of 9 to 11 g/liter of said microemulsion.

11. The method according to claim 5, wherein the raw material for the formation of said semiconducting metal oxide is the metal alkoxide or metal halogenide of at least one member selected from the group consisting of titania and zinc oxide.

12. The method according to claim 5, wherein the raw material for the formation of said ferromagnetic metal particles is a metal alkoxide or halogenide of at least one member selected from the group consisting of nickel, cobalt, and iron.

13. The method according to claim 5, wherein said heat treatment under a reducing condition is carried out at a temperature in the range of 250° to 400° C.

14. The method according to claim 5, wherein the sum of the amounts of the raw material for the semiconducting metal oxide crystals and the raw material for the ferromagnetic metal-containing particles to be added to the microemulsion is such that said ferromagnetic metal particles account for 2 to 20% by weight, based on the amount of said photocatalyst particles.

* * * * *